United States Patent
Christo et al.

(10) Patent No.: US 8,964,102 B2
(45) Date of Patent: Feb. 24, 2015

(54) SELF-CALIBRATED RINGING COMPENSATION FOR AN AUTOFOCUS ACTUATOR IN A CAMERA MODULE

(75) Inventors: Forrest B. Christo, San Diego, CA (US); Antonio Galimberti, Milan (IT)

(73) Assignee: Maxim Integrated Products, Inc., San Jose, CA (US)

( * ) Notice: Subject to any disclaimer, the term of this patent is extended or adjusted under 35 U.S.C. 154(b) by 325 days.

(21) Appl. No.: 13/533,039

(22) Filed: Jun. 26, 2012

(65) Prior Publication Data

US 2013/0169857 A1 Jul. 4, 2013

Related U.S. Application Data

(60) Provisional application No. 61/502,788, filed on Jun. 29, 2011.

(51) Int. Cl.
*H04N 5/232* (2006.01)
*G03B 17/00* (2006.01)
*G03B 3/10* (2006.01)

(52) U.S. Cl.
CPC .................................. *H04N 5/23212* (2013.01)
USPC ............. 348/349; 348/345; 348/347; 396/55; 396/133; 396/134

(58) Field of Classification Search
CPC ........ H04N 17/00; G03B 13/36; G03B 13/30; G03B 13/12; G03B 13/32
USPC .................... 348/349, 187, 208.11, 347, 345; 396/55, 133, 134
See application file for complete search history.

(56) References Cited

U.S. PATENT DOCUMENTS

| | | | |
|---|---|---|---|
| 7,769,281 B1* | 8/2010 | Gutierrez | 396/55 |
| 2002/0030756 A1* | 3/2002 | Inoue | 348/345 |
| 2002/0145953 A1* | 10/2002 | Kadlec et al. | 369/44.29 |
| 2002/0171751 A1* | 11/2002 | Ohkawara | 348/347 |
| 2007/0280668 A1* | 12/2007 | Kubo et al. | 396/133 |
| 2008/0218613 A1* | 9/2008 | Janson et al. | 348/262 |
| 2010/0171837 A1* | 7/2010 | Pillman et al. | 348/187 |
| 2010/0322612 A1* | 12/2010 | Tsuda et al. | 396/133 |
| 2011/0236008 A1* | 9/2011 | Kang et al. | 396/133 |

* cited by examiner

*Primary Examiner* — Sinh Tran
*Assistant Examiner* — Xi Wang
(74) *Attorney, Agent, or Firm* — North Weber & Baugh LLP (57) ABSTRACT

Various embodiments of the present invention relate to an actuator driver in a camera module, and more particularly to methods, systems and devices of employing self-calibrated ringing compensation to improve the autofocus rate of the camera module that is driven by an actuator. Oscillation characteristics of the actuator are calibrated to control a sink current that drives the actuator during an autofocus. The actuator driver comprises a digital-to-analog converter (DAC), a filter, a current sink and a self calibration module. The self calibration module calibrates the free-oscillation frequency and damping coefficient, and accordingly, the DAC generates a voltage that may be subsequently bypassed, filtered or shaped by the filter. This voltage is further converted to the sink current by the current sink. Such self-calibrated ringing compensation allows close tracking of free oscillation, and may efficiently enhance the settling time of the lens and autofocus rate of the camera module.

18 Claims, 12 Drawing Sheets

SELF-CALIBRATED RINGING COMPENSATION FOR AN AUTOFOCUS ACTUATOR IN A CAMERA MODULE

CROSS REFERENCE TO RELATED APPLICATION

The application claims the benefit under 35 U.S.C. §119(e) of Provisional Application Ser. No. 61/502,788, entitled "Self-Calibrated Ringing Compensation for an Autofocus Actuator in a Camera Module", filed on Jun. 29, 2011, the subject matter of which is incorporated herein by reference.

BACKGROUND

A. Technical Field

The present invention relates generally to an actuator driver in a camera module, and more particularly to methods, systems and devices of employing self-calibrated ringing compensation to improve the autofocus convergence time of the camera module that is based on a voice coil motor (VCM) or other actuator with resonant behavior. The free-oscillation frequency and damping coefficient of the VCM are calibrated, and used to control a sink current that drives the VCM.

B. Background of the Invention

Camera phones have been the fast-growing consumer electronic device in the market, and miniaturized camera modules are included in these phones. Size and cost have always been of the primary importance to these camera modules, while real camera performance is also on high demand. In particular, evolution of the camera modules has been driven by a demand for high resolution. In order to make the best use of the increasing resolution, effective and rapid autofocus (AF) is needed to accompany the increase in pixels. Today, autofocus has become a standard feature in most camera modules, and thereafter, enables more camera features including optical zoom, shutter control and image stabilization.

Autofocus is dependent from the ability of a lens driver to move the lens of a camera module rapidly so as to achieve focus of an image. A typical lens actuator may be based on a digital stepper motor, a piezoelectric motor, a MEMS actuator, or a voice coil motor (VCM). The lens driver varies according to the lens actuator in use. For example, the lens driver generates a voltage to drive the digital stepper or piezoelectric motor, or a current to drive the VCM. The VCM-based lens actuator is used in more than 90% of current camera modules, and therefore, a lens driver is needed to generate a desirable current for rapid positioning and autofocus of the lens in most state-of-the-art camera modules.

Figure 1A:
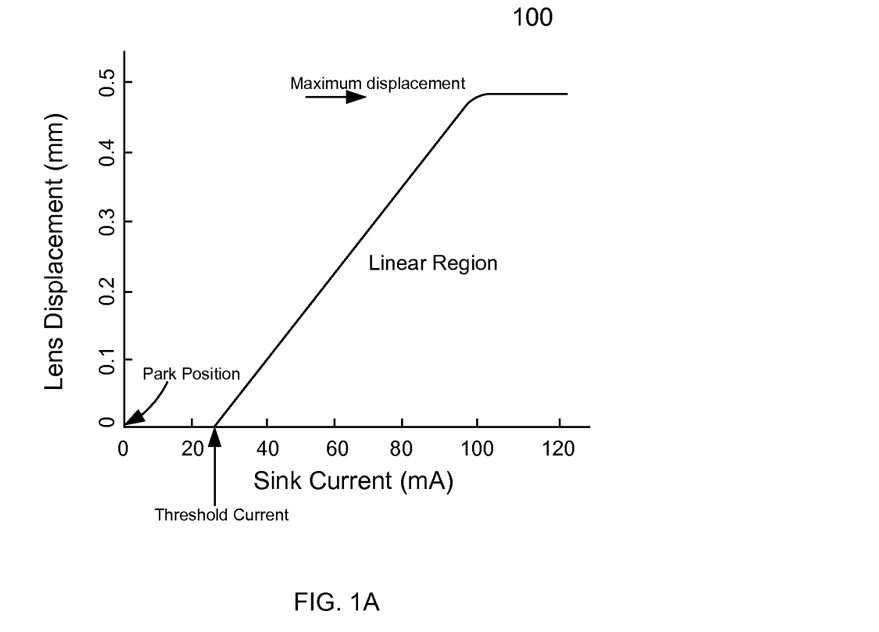
FIG. 1A illustrates a typical relationship between the lens displacement and the sink current for a VCM-based lens actuator.

The VCM-based lens actuator is analogous in concept and operation to a miniaturized speaker. The lens barrel is wrapped with a coil that is placed in close proximity to a permanent magnet, or group of magnets. A spring maintains the lens barrel at an infinite-focus position (i.e., a park position) that is associated with no power dissipation. When a sink current is injected to the voice coil, a Lorentz force produced by the interaction of the current in the coil and the permanent magnets causes the lens barrel to move to a static position determined by the balance of forces between the Lorentz force and spring return force. FIG. 1A illustrates a typical relationship 100 between the lens displacement and the sink current for a VCM-based lens actuator. The sink current needs to exceed a threshold current to cause any displacement from a park position. Beyond the threshold current, the lens displacement has a linear correlation with the sink current until it reaches a maximum displacement. Despite its current consumption at the focus position, the VCM-based lens actuator is a low-cost solution that is mechanically robust, shock-resistant and exhibits relatively low hysteresis.

Figure 1B:
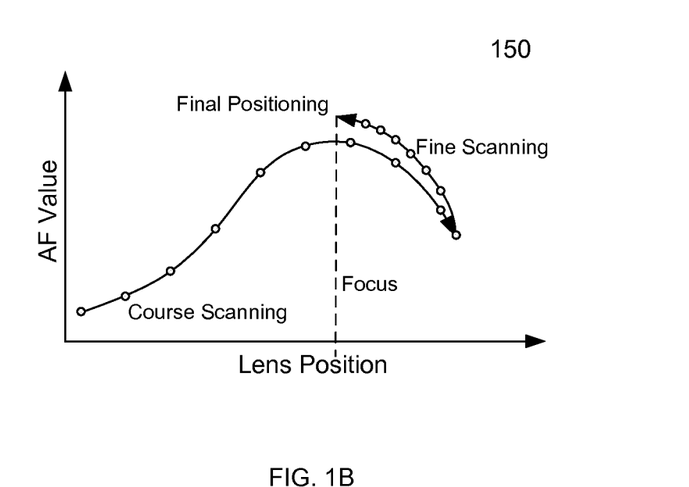
FIG. 1B illustrates a relationship between an autofocus value (AFV) and the lens position in a closed-loop autofocus method that is based on a standard hill-climbing control.

A closed-loop autofocus method is employed to move the lens in a VCM-based camera module to its focus position. FIG. 1B illustrates a relationship 150 between an autofocus value (AFV) and the lens position in a closed-loop autofocus method that is based on a standard hill-climbing algorithm. The AFV is associated with the quality of an image, and an exemplary AFV is the contrast of the image. In a coarse scanning step, the sink current increases at a relatively large current step to allow the lens displacement to scan from zero to the maximum displacement rapidly. The AFV is analyzed to indicate the quality of the image, and particularly, an AFV peak is approximately identified. In a subsequent fine scanning step, the lens is moved back to the position associated with the AFV peak at a smaller step, and located to a focus position in a final positioning step. The focus position is close to the position associated with the AFV peak in the coarse scanning step, and may be accurately identified in the fine scanning.

Figure 2:
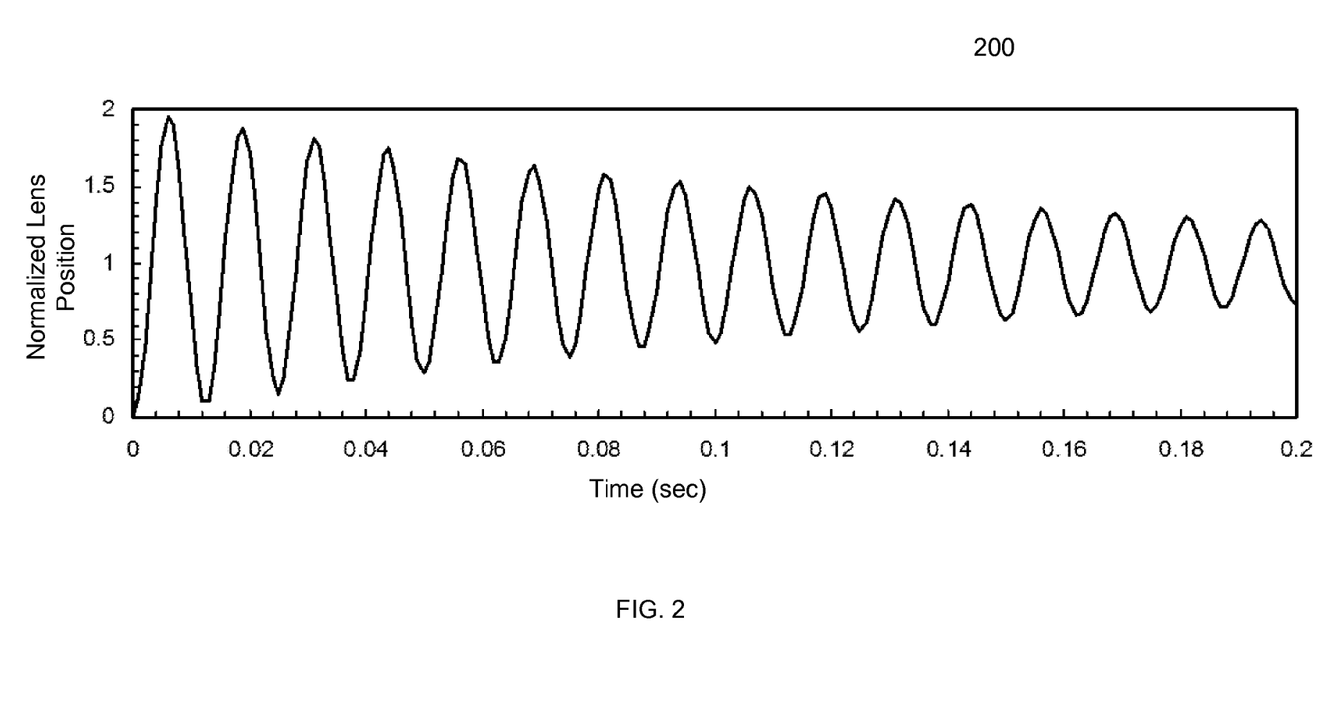
FIG. 2 illustrates an exemplary time diagram of a lens position that is associated with a VCM-based lens actuator driven by a step sink current.

The spring-loaded VCM system is modeled as a damped harmonic oscillator, and therefore, during each lens positioning sub-step in the autofocus process, the lens position is associated with overshooting and oscillation before the lens settles at the target position. FIG. 2 illustrates an exemplary time diagram 200 of a lens position that is associated with a VCM-based lens actuator driven by a step sink current. When the current step is applied to the VCM, the lens barrel moves from its park position, overshoots to a peak location, oscillates at its free-oscillation frequency, and settles at the target lens position. Such an overshooting-oscillating-settling process may take a settling time of up to 100-200 msec (i.e., 5-10 oscillation cycles) to complete each lens positioning sub-step in the closed-loop autofocus. This settling time may not be accommodated to most of the state-of-the-art camera modules that are capable of capturing still images and video frames at a fast autofocus rate.

SUMMARY OF THE INVENTION

Various embodiments of the present invention relate to an actuator driver in a camera module, and more particularly to methods, systems and devices of employing self-calibrated ringing compensation to improve the autofocus rate of the camera module that is based on a voice coil motor (VCM). The free-oscillation frequency and damping coefficient of the VCM are calibrated, and used to control a sink current that drives the VCM during an autofocus.

One aspect of the invention is a VCM driver that comprises a digital-to-analog converter (DAC), a filter, a current sink and a resonance calibration module. The DAC generates a voltage that may be subsequently bypassed, filtered or shaped by the filter. The voltage controls the current sink to generate a sink current. In response to free oscillation, the self calibration module is used to calibrate the free-oscillation frequency and the damping coefficient during calibration, and thereafter, generate a filter control signal according to these calibrated parameters to control the filter during lens positioning.

Another aspect of the invention is a self-calibrated ringing compensation method that comprises generating a sink current that induces free oscillation, measuring the free-oscillation frequency and the damping coefficient to determine a filter control signal, and configuring the VCM driver to generate a second sink current that compensates free oscillation. Such self-calibrated ringing compensation allows close tracking of free oscillation, and may efficiently enhance both the settling time of the lens and the autofocus rate of the camera module.

Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of structures. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

A voice coil motor (VCM) loaded with a lens forms a mechanical oscillation system that may oscillate at a free-oscillation frequency. The free-oscillation frequency of such free oscillation is dependent from the stiffness of a VCM coil, the total mass of the VCM loaded with the lens, and the damping coefficient for the VCM. The free-oscillation frequency varies for each specific VCM loaded with a lens, and in particular, variation of the damping coefficient (e.g., gas ambient) may also cause a shift of the free-oscillation frequency.

In the case of a step sink current (FIG. 2), free oscillation of the VCM is easily induced by the sink current at the free-oscillation frequency, even though the sink current peaks at a different frequency and already decays to a small amplitude at this free-oscillation frequency in the frequency domain. Both amplitude and settling time of the free oscillation is directly associated with the magnitude of the sink current at this free-oscillation frequency. In order to achieve a fast autofocus rate, free oscillation needs to be suppressed or reduced, and a preferred method is to reduce the sink current at the free-oscillation frequency and thus compensate free oscillation (i.e., ringing) at the free-oscillation frequency.

An efficient ringing compensation method is preferred to be based on accurate calibration of the free-oscillation frequency, since the free-oscillation frequency varies among VCMs and drifts even for the same VCM over time due to aging effects. Various embodiments of the present invention relate to a self-calibrated ringing compensation method to reduce free oscillation of the VCM and allow a fast autofocus convergence time in an autofocus process in a camera module.

Figure 3:
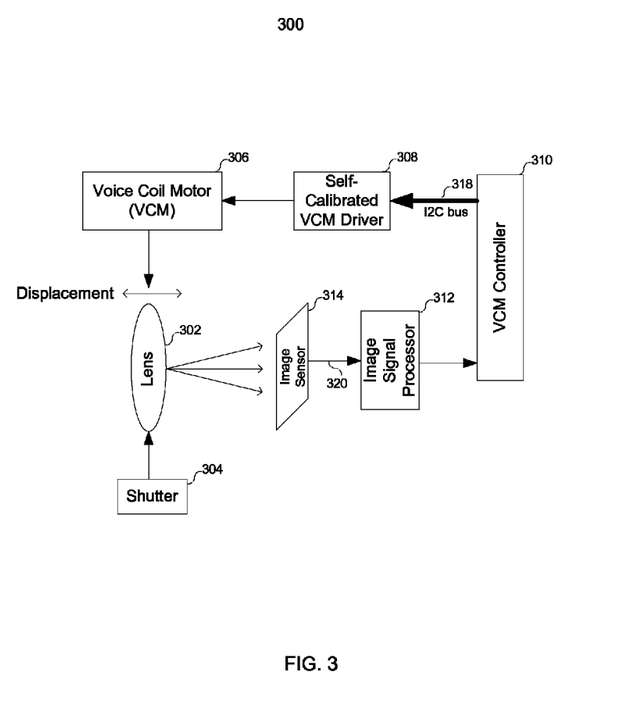
FIG. 3 illustrates an exemplary block diagram of a camera module according to various embodiments of the invention.

FIG. 3 illustrates an exemplary block diagram 300 of a camera module according to various embodiments of the invention. The camera module 300 comprises a lens 302, a shutter 304, a voice coil motor (VCM) 306, a self-calibrated VCM driver 308, a VCM controller 310, an image processing processor 312 and an image sensor array 314. The camera module 300 incorporates self-calibrated ringing compensation by calibrating the free-oscillation frequency of the VCM 306, and generates a compensated sink current 316 that is reduced at this free-oscillation frequency so as to reduce associated free oscillation of the VCM 304.

The lens 302 is coupled to the shutter 304 and the VCM 306. In particular, the lens 302 is attached to the VCM 306. The lens 302 receives light during an exposure period and prior to the exposure period 304, the VCM 306 drives the lens 302 to move back and forth and stop at a focus position in an autofocus process. For each lens positioning sub-step in the autofocus process, the VCM 306 and the lens 302 experience free oscillation prior to settling at a lens position.

The VCM 306 is coupled to the self-calibrated VCM driver 308 that generates a sink current 316 to drive the VCM 306. The sink current 316 that is injected to the VCM coil works with permanent magnets to generate Lorentz force and move the lens 302 along with the VCM coil. A step sink current is normally generated to drive the VCM 306, and however, is associated with relatively long settling times due to free oscillation of the VCM 306 loaded with the lens 302. In various embodiments of the present invention, the step sink current may still be used to trigger free oscillation and allow calibration of the free-oscillation frequency of the VCM 306 that is loaded with the lens 302.

One of those skilled in the art knows that a sink current other than a step sink current may also be used to calibrate the free-oscillation frequency although a step sink current may have a simplest format and is easy to implement. In one embodiment, a sinusoidal sink current at a certain frequency is used to calibrate the free-oscillation frequency. The current amplitude may be fixed while the frequency of the sinusoidal sink current varies over a frequency range, and the sink current causing largest oscillation amplitude is associated with the free-oscillation frequency.

The self-calibrated VCM driver 308 is coupled to the VCM controller 310, and receives current control signals 318 from the VCM controller 310. In various embodiments of the invention, the VCM controller 310 may also be included in the self-calibrated VCM driver 308. The current control signals 318 include at least a current magnitude data that is used to define the magnitude of the sink current 316. In certain embodiments, the current control signals 318 are communicated between the self-calibrated VCM driver 308 and the VCM driver controller 310 via a standard inter-integrated circuit (I²C) bus that uses two bidirectional lines, Serial Data Line (SDA) and Serial Clock (SCL).

In certain embodiments, the VCM 306 further comprises a filter that changes the profile of the sink current in the time-domain to reduce free-oscillation. The resonance and damping coefficient calibration process is used to generate a filter control signal. In one embodiment, the filter control signal is just disabled to bypass the filter such that a step sink current is outputted to calibrate the free-oscillation frequency. In another embodiment, the filter control signal is enabled to suppress or reduce the amplitude of the sink current in the frequency domain at the free-oscillation frequency during the autofocus process.

The camera module 300 includes another image processing path that comprises the lens 302, the image sensor 314 and the image signal processor 312. An image is projected by the lens 302 onto the image sensor array 314 that generates raw video signals 320 from the image. In one embodiment, the image sensor array 314 comprises a plurality of CCD (charge coupled device) sensors. The image signal processor 312 is coupled to the image sensor array 314. The raw video signal is further amplified, conditioned and converted to digital in the image signal processor 312.

In certain embodiments, the above image processing path is used to provide the VCM controller 310 with feedback information about the image quality when the lens 302 is actuated to a lens position under the control of a sink current. The image quality may be quantitatively represented by an image quality parameter, such as image contrast. In one embodiment, a step sink current is generated to drive the VCM 306, and the image contrast is tracked in real time by the image signal processor 312. The VCM controller 310 is coupled to receive the real-time image contrast. The time period between two contrast peaks is used to derive the free-oscillation frequency of the free oscillation of the VCM 306. Therefore, the VCM controller 310 may generate the current control signals according to the time period between two contrast peaks, and in a subsequent autofocus process, the current control signals are used to control the self-calibrated VCM driver 308 to generate a sink current reduced at this free-oscillation frequency.

In another embodiment, during an autofocus process, the image quality parameter is generated by the image signal processor 312 and used by the VCM controller 310 to determine whether a sink current step is completed. In FIG. 1B, the autofocus process comprises three steps, coarse scanning, fine scanning and final positioning, and each of these steps includes multiple lens positioning sub-steps, each of which is associated with sink current delivery and lens positioning. Therefore, the image quality parameter is equivalent to the autofocus value previously presented in FIG. 1B. In one embodiment, when the variation of the image quality parameter settles below a certain value, one sub-step is regarded as completed, and the lens may be moved to the next lens position. At the end of the autofocus process, the focus position is associated with the best image quality parameter. In one embodiment, the focus position is associated with the highest contrast of the image during the entire autofocus process.

Figure 4A:
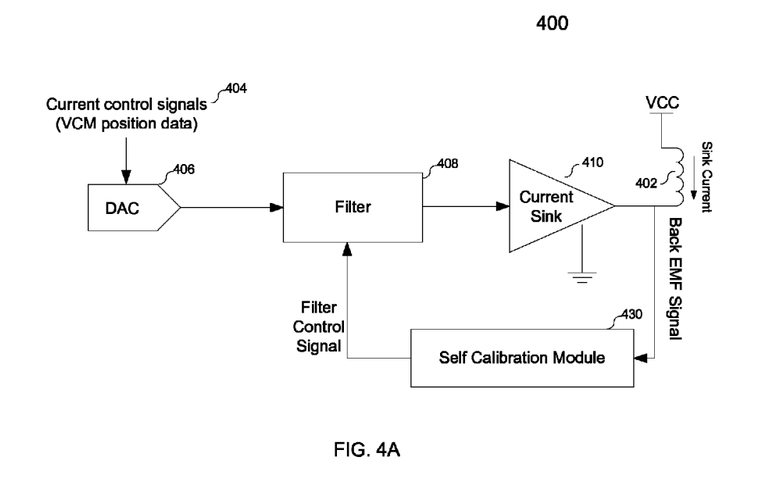
FIG. 4A illustrates an exemplary self-calibrated VCM driver that incorporates self-calibrated ringing compensation according to various embodiments of the invention.

FIG. 4A illustrates an exemplary block diagram 400 of a self-calibrated VCM driver that incorporates self-calibrated ringing compensation according to various embodiments of the invention. The VCM driver 400 comprises a digital-to-analog converter (DAC) 406, a filter 408, a current sink 410 and a self calibration module 430. The VCM driver 400 receives the current control signals 404 from a VCM driver controller, and the current control signals include a current magnitude data that is associated with a target lens position. This VCM driver 400 calibrates the free-oscillation frequency and a damping coefficient of the VCM motor 306 loaded with the lens 302, and generates the sink current according to the current control signals and/or these calibrated parameters.

The DAC 406 is coupled to receive the current control signals, and generates a sink voltage according to the current magnitude data. The filter 408 is coupled to the DAC 406, and receives the sink voltage and a filter control signal. In certain embodiments, the filter 408 is a digital filter, and may be directly coupled to receive and process the current control signals prior to sending the current control signals to the DAC 406.

In various embodiments of the invention, the filter 408 may comprise a plurality of signal shaping circuits, and each signal shaping circuit may be individually adjusted. The filter 408 is configured according to the filter control signal, and thus, filters the sink voltage or the current control signals based on a corresponding filtering profile. In particular, the resulting sink voltage at a certain frequency range is suppressed or reduced, and this certain frequency range covers the free-oscillation frequency.

In one embodiment, the filter 408 comprises one or multiple configurations that may be enabled according to the filter control signal. In certain embodiment, the filter 408 includes a band-reject filter, and a certain band of frequency is rejected around the free-oscillation frequency. The rejected frequency band is adjustable according to the filter control signal. In certain embodiment, the filter control signal may bypass the filter, and a step sink voltage is generated without being filtered.

The current sink 410 is coupled to the filter 408, and converts the sink voltage to a sink current that is further used to drive a VCM coil 402 in the VCM 306. In the frequency domain, the current sink 410 behaves like a low-pass filter that has a cutoff frequency much higher than the free-oscillation frequency. As a result, the sink current adapts the band rejection around the free-oscillation frequency, and results in reduced free oscillation of the VCM 306 loaded with the lens 302.

The VCM driver 400 identifies the free-oscillation frequency and the corresponding filter control signal using the self calibration module 430, rather than the image quality parameters provided by the image signal processor 312. The self calibration module is coupled to receive a back EMF signal, and this back EMF signal may be extracted from the VCM coil 402 and associated with the lens position/displacement. During free oscillation, the back EMF signal demonstrates an electrical oscillation that decays and settles to a certain voltage level. Therefore, the self calibration module 430 is used to process the back EMF signal, identify the free-oscillation frequency and the damping coefficient, and generate the filter control signal.

During self calibration of free oscillation, the filter 408 is bypassed to allow a step sink current to be injected to the VCM coil 402. The filter control signal is subsequently identified by the self calibration module 430 according to the calibrated parameters. In subsequent autofocus processes, this filter control signal may be employed to enable a certain filter configuration to suppress or reduce the sink current at the free-oscillation frequency.

Figure 4B:
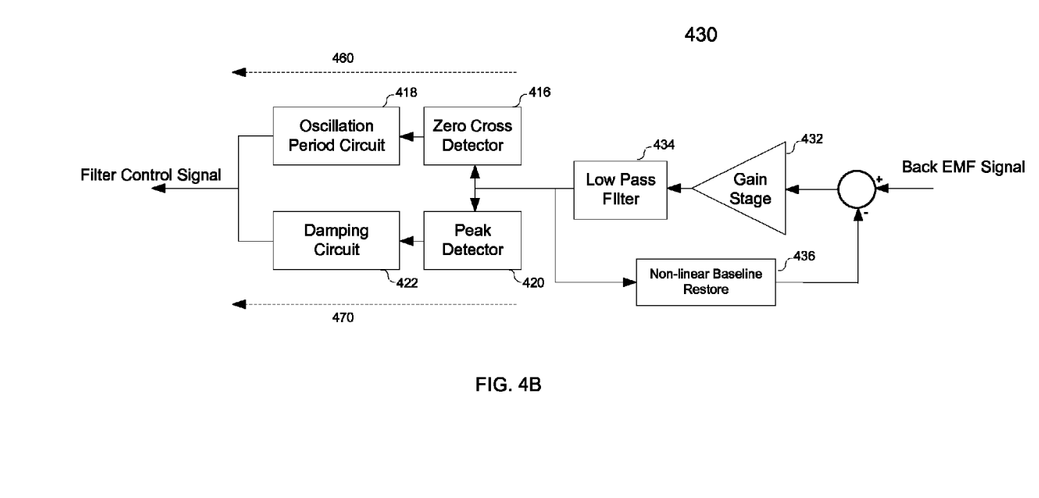
FIG. 4B illustrates an exemplary block diagram of a self calibration module according to various embodiments of the invention.

FIG. 4B illustrates an exemplary block diagram 430 of a self calibration module according to various embodiments of the invention. The self calibration module 430 comprises a gain stage 432, a low-pass filter 434, a base line restorer 436, a zero cross detector 416, an oscillation period circuit 418, a peak detector 420 and a damping circuit 422.

Figure 4C:
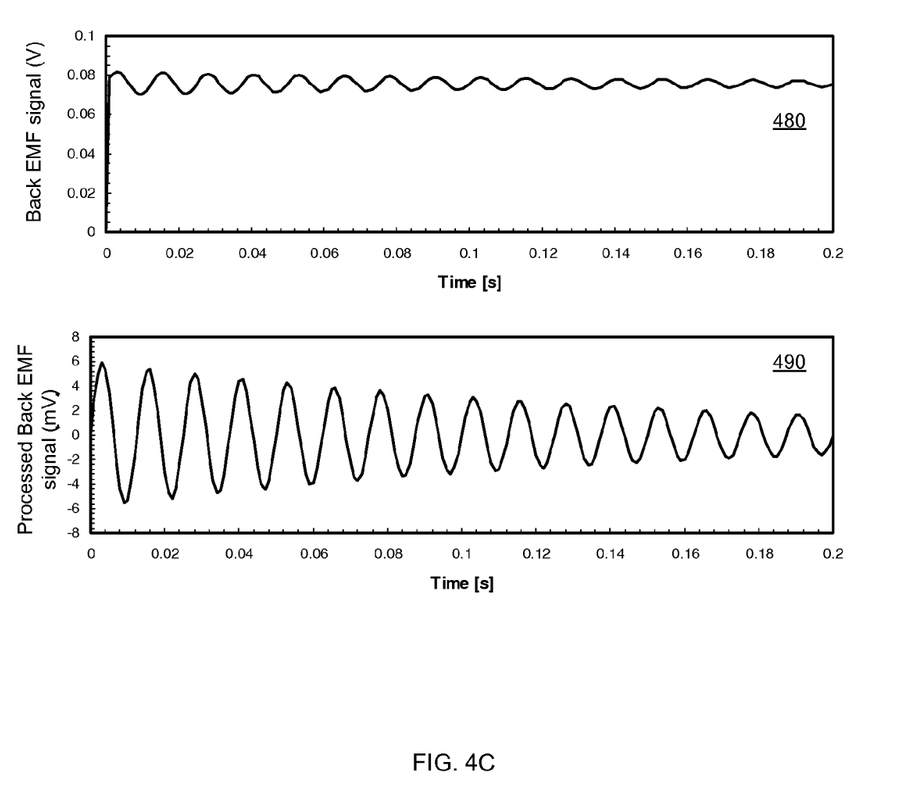
FIG. 4C illustrates exemplary time-domain diagrams of a back EMF signal and a processed back EMF signal according to various embodiments of the invention.

The gain stage 432, the low-pass filter 434 and the base line restorer 436 are first used to condition the back EMF signal in the self calibration module 430. FIG. 4C illustrates exemplary time diagrams 480 and 490 of a back EMF signal and a processed back EMF signal according to various embodiments of the invention. The back EMF signal 480 is associated with the lens position, and demonstrates an electrical oscillation that decays and settles to a base line voltage. The base line restorer 436 removes the input off-set voltage generated by the steady-state current flowing through the VCM. The gain stage 432 amplifies the back EMF signal in reference to the base line voltage. The low-pass filter 434 is used to filter the back EMF signal to remove high-frequency noise.

The zero cross detector 416 and the oscillation period circuit 418 forms a path 460 to determine the filter control signal according to the free-oscillation frequency of the processed back EMF signal. The zero cross detector 416 detects the instants when the processed EMF signal crosses zero (i.e., the ground). The oscillation period circuit 418 is subsequently used to determine the oscillation period, and generate the filter control signal associated with the oscillation period and the corresponding free-oscillation frequency.

The peak detector 420 and the damping circuit 422 forms a path 470 to determine the filter control signal according to the damping coefficient. The peak detector 420 detects the amplitudes of the back EMF signal when it reaches peaks. The damping circuit 422 subsequently compares the amplitudes of these peaks to determine the damping coefficient of the actuator. In certain embodiment, if the amplitudes drop significantly between consecutive peaks, the damping coefficient is large, and no filter is even needed. As a result, the paths 460 and 470 are used to determine the frequency and the power of the filter 408, respectively.

Figure 5A:
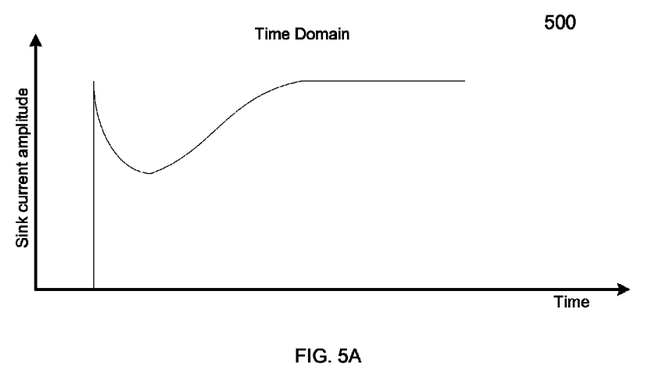
FIGS. 5A and 5B illustrate an exemplary time-domain plot of a sink current transition signal that is filtered at the free-oscillation frequency and the corresponding frequency response of said filter according to various embodiments of the invention.
Figure 5B:
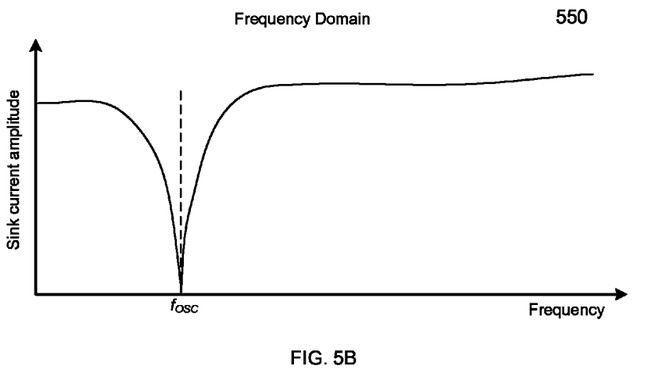

FIG. 5A illustrates an exemplary time diagram 500 of a sink current reduced at the free-oscillation frequency according to various embodiments of the invention, and FIG. 5B illustrates a corresponding frequency response 550 of the sink current according to various embodiments of the invention. The free-oscillation frequency of the VCM 306 is first calibrated, and identified at a frequency $f_{osc}$. Rejection is subsequently generated around the free-oscillation frequency $f_{osc}$ for the sink current using the filter 408. In certain embodiments, it may take 5-10 free oscillation cycles for the lens to settle at a target lens position when a step sink current is applied, and in FIG. 5A, self-calibrated ringing compensation reduces the overshoot and allows the lens position to settle in less than one oscillation cycle.

One of those skilled in the art will know that the lens position is regarded as settling at the target position, if free oscillation of the lens decays below a threshold amplitude that is not detectable by the image signal processor 312 or if the amplitude of the associated back EMF signal drops below a negligible threshold voltage.

Figure 6:
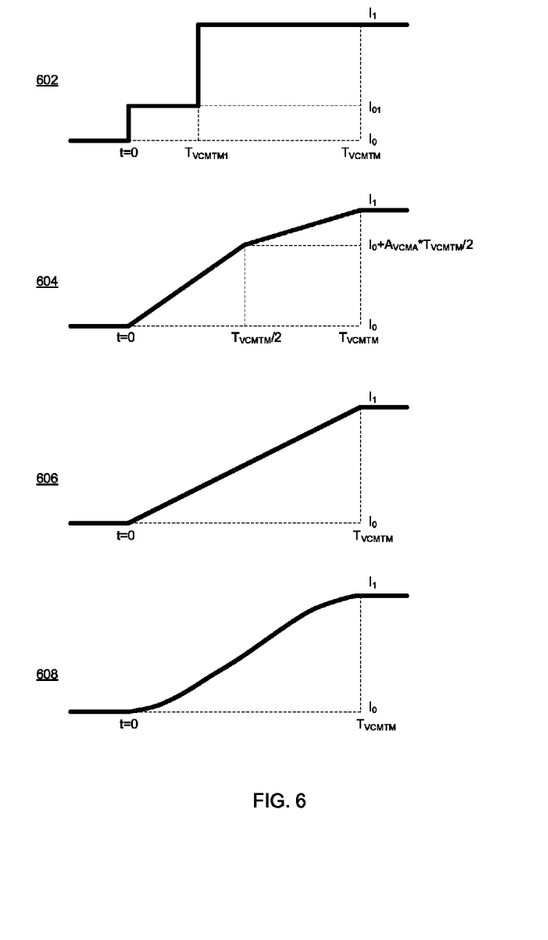
FIG. 6 illustrates some exemplary sink currents for ringing compensation according to various embodiments of the invention.

One of those skilled in the art will know that ringing compensation is not limited to the sink current in FIGS. 5A and 5B, and alternative sink currents may also be used according to the filter control signal to reduce the overshot and improve the settling time of free oscillation. FIG. 6 illustrates some exemplary sink currents for ringing compensation according to various embodiments of the invention. These sink currents include a dual step sink current 602, a dual slope sink current 604, a single slope current 606, and a low pass sink current 608. Various current-shaping configurations may be incorporated in the filter 408 to shape the sink current and generate these exemplary sink currents. Hereby, the filter 408 is employed as a current shaping module.

The sink currents 602-608 start from zero current or a current of $I_0$ at the starting time, and raises to a current of $I_1$ at time $T_{VCMTM}$. Zero current is associated with an infinity-focus point, while the current of $I_0$ is associated with an initial lens position. In the dual step sink current 602, a small magnitude $I_{01}$ is enabled at the starting time, and raised to the target sink current $I_1$ at a delay time VCMTM. In the dual slope sink current 604, two segmented piecewise linear currents are continuously applied. The first current starts from a current $I_0$ at the starting time, and ends at a current $I_0 + A_{VCMA} * T_{VCMTM}/2$ at time $T_{VCMTM}/2$, where $A_{VCMA}$ is the current increase rate. The second current starts from the end of the first current at time $T_{VCMTM}/2$, and ends at a current $I_1$ at time $T_{VCMTM}$. The single slope current 606 includes a single linear segment of current starting from zero at the starting time and to a current $I_1$ at time $T_{VCMTM}$. The low pass sink current 608 is shaped with a Gaussian low-pass filter based on an internal 64-word look up table.

Figure 7:
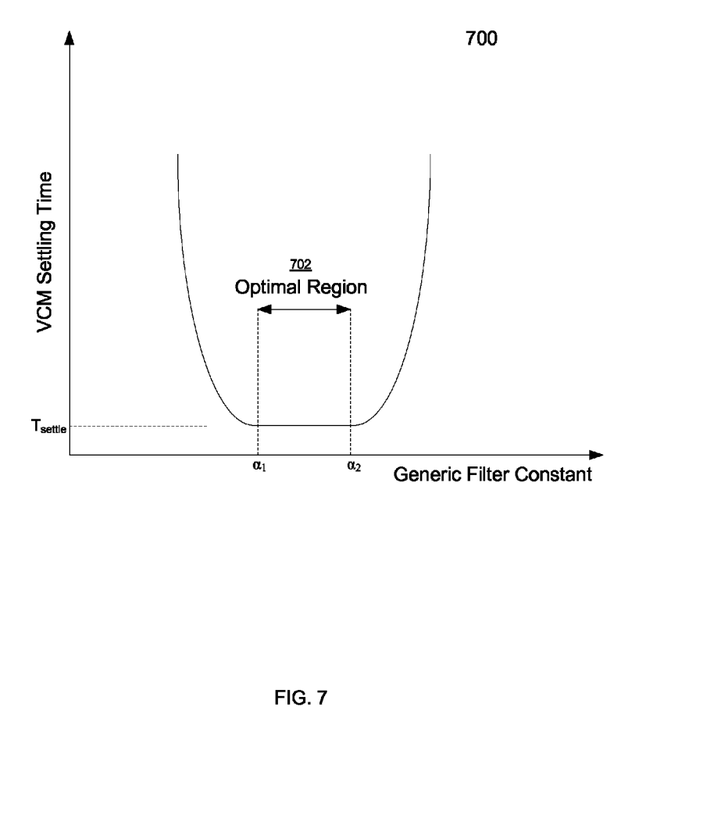
FIG. 7 illustrates an exemplary dependence curve between an oscillation settling time and a filter constant according to various embodiments of the invention.

The parameter $T_{VCMTM}$ represents the time for the currents 602-608 to reach the target sink current $I_1$. The sink currents 602-608 may be generated by the signal shaping circuits in the filter 408, and therefore, the parameter $T_{VCMTM}$ is associated with a filter constant or power of the filter 408. A smaller $T_{VCMTM}$ and a sharper current transition is normally associated with a larger filter constant. FIG. 7 illustrates an exemplary dependence curve 700 between an oscillation settling time and a generic filter constant according to various embodiments of the invention. This dependence curve 700 is associated with a single slope curve 606. An optimal region 702 is identified between the filter constants $\alpha_1$ and $\alpha_2$, and within the optimal region 702, the oscillation settling time is suppressed at a low value $T_{settle}$. A larger or smaller filter constant increases the settling time, and may easily result in a worse settling time than the case when no filter is employed on a simple step sink current. In certain embodiments, the width of the optimal region 702 is +/−10% or less than the of the magnitude of the center filter constant. The filter control signal is used to configure the filter 408 according to the filter constant. The filter control signal is preferred to be frequently updated, such that the filter 408 remains within the optimal region 702 even when the free-oscillation frequency drifts.

Figure 8:
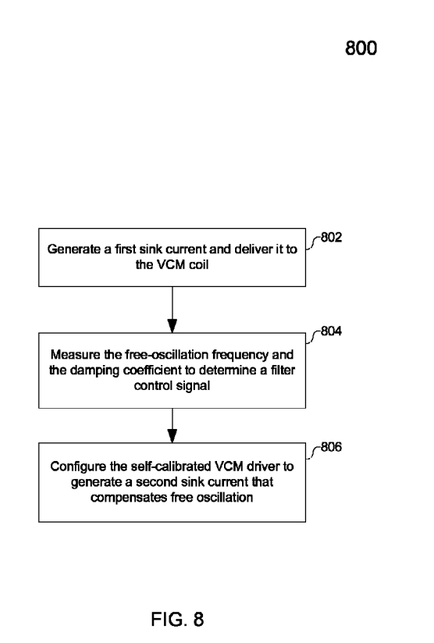
FIG. 8 illustrates an exemplary method of self-calibrated ringing compensation in a camera module according to various embodiments of the invention.

FIG. 8 illustrates an exemplary method 800 of self-calibrated ringing compensation of a VCM driver in a camera module according to various embodiments of the invention. At step 802, a first sink current is generated and delivered to the VCM coil 402. The first sink current is employed to move the lens 302 and induce free oscillation associated with the VCM 306 that is loaded with the lens 302. In one embodiment, the first sink current is a step current switched on at the starting time, and no filtering or current shaping is involved to better preserve free oscillation. In another embodiment, the first sink current is a sinusoidal wave current, and the frequency varies to result in various mechanical responses.

At step 804, the free-oscillation frequency and the damping coefficient are measured during free oscillation, and a filter control signal is determined according to these two parameters. In various embodiments of the invention, these parameters may be generated by monitoring the quality of the image that is captured by the image signal processor 312, or by tracking an electrical signal that is associated with the lens position. Steps 802 and 804 are associated with a self-calibration mode of the camera module.

At step 806, the filter control signal is used to configure the VCM driver to generate a second sink current that compensates free oscillation during a lens positioning process. The lens positioning process may be a sub-step in an autofocus process. In one embodiment, a band-reject filter may be used to shape the current, and the current sink output has reduced amplitude at the free-oscillation frequency in the frequency domain. In various embodiments of the invention, alternative current shaping methods may also be used to compensate ringing from free oscillation as well. The exemplary sink currents include the dual step, dual slope, single slop, low pass sink current 602-608, and each may be implemented by configuring a filter. The filter constant may included an optimal region in which ringing from free oscillation is effectively suppressed/reduced. Step 806 is associated with a lens positioning mode in the camera module.

The self-calibration mode may be implemented frequently to ensure accurate ringing compensation during the life span of the camera module. In one embodiment, the self-calibration mode may be used before the camera module is out of factory. In certain embodiments, this mode is used every time the camera module is powered on or every time a smart phone switches to a camera mode. Based on constant calibration, ringing compensation maintains at an efficient level and allows the camera module to have a fast autofocus convergence time.

One of those skilled in the art will recognize that self-calibrated ringing compensation is applicable in other lens actuators such as a digital stepper motor, a piezoelectric motor or a MEMS actuator. These lens actuators may be driven by a voltage. Therefore, the free-oscillation frequency and the damping coefficient are calibrated to adjust filtering or voltage shaping of the voltage, and therefore, reduces free oscillation. The settling time of the lens will be improved to enable a fast autofocus convergence time.

Figure 9A:
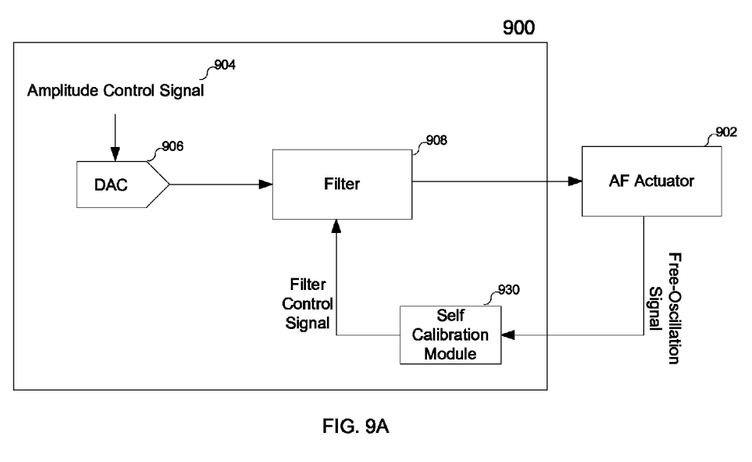
FIG. 9A illustrates a block diagram of an actuator driver loaded with an AF actuator 902 according to various embodiments of the invention.

FIG. 9A illustrates a block diagram 900 of an actuator driver loaded with an AF actuator 902 according to various embodiments of the invention. The actuator driver 900 comprises a digital-to-analog converter (DAC) 906, a filter 908 and a self calibration module 930. The actuator driver 900 receives the amplitude control signals 904, and the amplitude control signals include a current magnitude data that is associated with a target lens position. The DAC 906 and the filter 908 generate a voltage signal to drive the actuator 902. To driver a VCM, the actuator driver 900 may further comprise a current sink to generate a sink current from the voltage signal, as illustrated in FIG. 4A. A back signal is associated with the lens position, and the self calibration module 930 generates a filter control signal from the back signal. The filter 908 is configured by the filter control signal to shape the voltage signal and suppress/reduce free oscillation during lens positioning.

Figure 9B:
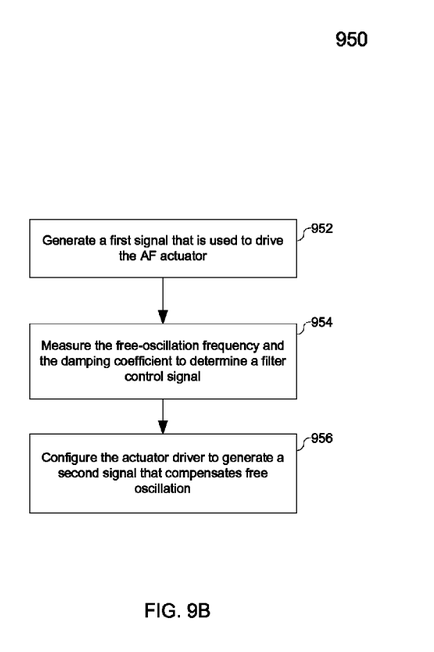
FIG. 9B illustrates an exemplary method of self-calibrated ringing compensation of an AF actuator in a camera module according to various embodiments of the invention.

FIG. 9B illustrates an exemplary method 950 of self-calibrated ringing compensation of an AF actuator in a camera module according to various embodiments of the invention. At step 952, a first signal is generated to drive the AF actuator. The first signal may be a voltage or a current. At step 954, the free-oscillation frequency and the damping coefficient are measured during free oscillation, and a filter control signal is determined according to these two parameters. At step 956, the filter control signal is used to configure the actuator driver to generate a second signal that compensates free oscillation.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

We claim:

1. A driver that drives an autofocus actuator within a camera module, comprising:
 a signal generator that receives an output control signal, the signal generator generating a first signal, the output control signal being associated with a target position of the autofocus actuator;
 a self calibration module, coupled to the autofocus actuator, the self calibration module calibrating free oscillation characteristics and generating a corresponding filter control signal;
 a filter, coupled to the signal generator and the self calibration module, the filter being configured to generate a second signal from the first signal according to the filter control signal;
 a current sink, directly coupled to the filter, the current sink generating a sink current from the second signal and driving the autofocus actuator to the target position; and
 wherein the second signal is coupled to drive to the target position the autofocus actuator where lens of the camera module is attached, and the filter control signal is associated with reduced free oscillation as the autofocus actuator is controlled to settle at the target position.

2. The driver according to claim 1, wherein the sink current starts from an initial current and reaches a target current according to a current profile that is selected from a group consisting of a dual step current, a dual slope current, a single slope current and a low pass current.

3. The driver according to claim 1, wherein the sink current linearly increases from an initial current to a target current as a single slope current, and the filter is configured and constantly adjusted to remain within an optimal region such that a setting time for the autofocus actuator is maintained.

4. The driver according to claim 1, wherein the free oscillation characteristics comprise a free-oscillation frequency and a damping coefficient.

5. The driver according to claim 1, wherein the self calibration module calibrates the free oscillation characteristics by monitoring a feedback signal from the autofocus actuator, and the feedback signal is associated with a position and displacement of the lens.

6. The driver according to claim 1, wherein the signal generator is a digital-to-analog converter (DAC) that converts the output control signal to the first signal, and the first signal is an analog voltage.

7. The driver according to claim 1, wherein the filter is bypassed by the first signal to allow a step current sink to drive the autofocus actuator, as the self calibration module calibrates the free oscillation characteristics.

8. The driver according to claim 1, wherein the target position is associated with one substep within an autofocus process that comprises a coarse scan, a fine scan and a final positioning.

9. The driver according to claim 1, wherein the filter is a band rejection filter centered on a free-oscillation frequency calibrated by the self calibration module.

10. A method of self-calibrated ringing compensation in an autofocus actuator within a camera module, comprising the steps of:
    generating a first signal that induces free oscillation in the autofocus actuator where a lens of the camera module is attached;
    measuring free oscillation characteristics including a free-oscillation frequency to determine a filter control signal;
    configuring a filter according to the filter control signal so that the filer suppresses an amplitude of a sink current at the free-oscillation frequency as the autofocus actuator is controlled to settle at a target position;
    generating an initial signal from an output control signal that is associated with the target position of the autofocus actuator;
    filtering the initial signal to generate a second signal; and
    causing a current sink directly coupled to the filter to generate the sink current in response to the second signal.

11. The method according to claim 10, wherein the sink current starts from an initial current and reaches a target current according to a current profile, and the current profile is selected from a group consisting of a dual step current, a dual slope current, a single slope current and a low pass current.

12. The method according to claim 10, wherein the free oscillation characteristics comprise a damping coefficient.

13. The method according to claim 10, wherein the free oscillation characteristics are calibrated by monitoring a feedback signal from the autofocus actuator, and the feedback signal is associated with a position and displacement of the lens.

14. A driver that drives voice coil motor (VCM) within a camera module, comprising:
    a digital-to-analog converter (DAC) that receives a current control signal, the DAC generating a first voltage, the current control signal being associated with a target position of the VCM where lens of the camera module is attached;
    a self calibration module, coupled to the VCM, the self calibration module calibrating free oscillation characteristics of the VCM and generating a corresponding filter control signal;
    a filter, directly coupled to the DAC and the self calibration module, the filter being configured to generate a second voltage from the first voltage according to the filter control signal; and
    a current sink, directly coupled to the filter, the current sink generating a sink current from the second voltage and driving the VCM to the target position,
    wherein the filter control signal is associated with reduced free oscillation as the VCM is controlled to settle at the target position.

15. The driver according to claim 14, wherein the sink current linearly increases from an initial current to a target current as a single slope current, and the filter is configured and constantly adjusted to remain within an optimal region such that a setting time for the VCM is maintained.

16. The driver according to claim 14, wherein the free oscillation characteristics comprise a free-oscillation frequency and a damping coefficient.

17. The driver according to claim 14, wherein the self calibration module calibrates the free oscillation characteristics by monitoring a feedback signal from the VCM, and the feedback signal is associated with a position and displacement of the lens.

18. The driver according to claim 14, wherein the filter is bypassed by the first signal to allow a step current sink to drive the VCM, as the self calibration module calibrates the free oscillation characteristics.

* * * * *